United States Patent
Allen

(10) Patent No.: US 9,117,207 B2
(45) Date of Patent: Aug. 25, 2015

(54) CHECK VIEW SYSTEM WITH EMBEDDED EXPLANATION OF BENEFITS

(71) Applicant: StoneEagle Services, Inc., Richardson, TX (US)

(72) Inventor: Robert M. Allen, Richardson, TX (US)

(73) Assignee: StoneEagle Services, Inc., Richardson, TX (US)

( * ) Notice: Subject to any disclaimer, the term of this patent is extended or adjusted under 35 U.S.C. 154(b) by 435 days.

(21) Appl. No.: 13/709,717

(22) Filed: Dec. 10, 2012

(65) Prior Publication Data

US 2013/0325714 A1    Dec. 5, 2013

Related U.S. Application Data

(63) Continuation of application No. 13/495,492, filed on Jun. 13, 2012, now Pat. No. 8,332,238.

(60) Provisional application No. 61/653,175, filed on May 30, 2012.

(51) Int. Cl.

| | |
|---|---|
| *G06Q 50/00* | (2012.01) |
| *G06Q 20/10* | (2012.01) |
| *G06Q 40/02* | (2012.01) |
| *G06Q 50/22* | (2012.01) |
| *G06Q 20/04* | (2012.01) |
| *G06F 19/00* | (2011.01) |
| *G06Q 40/00* | (2012.01) |

(52) U.S. Cl.
CPC ............ *G06Q 20/108* (2013.01); *G06F 19/328* (2013.01); *G06Q 20/0425* (2013.01); *G06Q 40/02* (2013.01); *G06Q 50/22* (2013.01)

(58) Field of Classification Search
CPC .................... G06Q 50/22–50/24; G06Q 40/08
USPC ......................................................... 705/2–4
See application file for complete search history.

(56) References Cited

U.S. PATENT DOCUMENTS

| | | | |
|---|---|---|---|
| 4,491,725 A * | 1/1985 | Pritchard | 705/2 |
| 6,188,766 B1 | 2/2001 | Kocher | |
| 6,343,310 B1 | 1/2002 | DiRienzo | |

(Continued)

OTHER PUBLICATIONS

Shingles, et al., "Next Phase of Medical Management Systems: Automating Administrative Transactions to Integrate Payors and Providers", JHIM: Journal of Healthcare Information Management.

(Continued)

*Primary Examiner* — Robert Sorey
(74) *Attorney, Agent, or Firm* — Anton J. Hopen; Smith & Hopen, P. A.

(57) ABSTRACT

A method for facilitating the delivery of electronic funds and conveying an explanation of benefits to a service provider is described herein. A claim for payment by a service provider (such as a physician's office) is adjudicated by a third party administrator. An electronic funds transfer (EFT) is generated under a transaction set specification that encodes both payment information as well as an explanation of benefits (EOB). The EOB indicates which charges were approved and/or which were denied. The EOB data is extracted from the EFT and an image is generated containing the text of the EOB. The image is created in a format that is compatible with the online delivery of posted-paper checks. When the service provider logs into its bank to reconcile charges the EFT transaction is noted and the provider clicks on the "view check" link to obtain the EOB information.

12 Claims, 3 Drawing Sheets

(56) References Cited

U.S. PATENT DOCUMENTS

| | | | |
|---|---|---|---|
| 6,901,387 B2 | 5/2005 | Wells et al. | |
| 7,072,842 B2 | 7/2006 | Provost et al. | |
| 7,229,011 B2 | 6/2007 | Hansen et al. | |
| 7,246,068 B2 | 7/2007 | Thomas, Jr. | |
| 7,383,223 B1 | 6/2008 | Dilip et al. | |
| 7,434,729 B2 | 10/2008 | Cracchiolo et al. | |
| 7,548,641 B2* | 6/2009 | Gilson et al. | 382/137 |
| 7,590,557 B2 | 9/2009 | Harrison et al. | |
| 7,792,686 B2 | 9/2010 | Allen | |
| 7,792,749 B2 | 9/2010 | Ganesan | |
| 7,853,524 B2 | 12/2010 | Kight et al. | |
| 7,895,119 B2 | 2/2011 | Praisner | |
| 7,925,518 B2 | 4/2011 | Lee et al. | |
| 7,958,049 B2 | 6/2011 | Jamison et al. | |
| 7,970,629 B2 | 6/2011 | Christen | |
| 2002/0072942 A1 | 6/2002 | Kuykendall et al. | |
| 2002/0077837 A1 | 6/2002 | Krueger et al. | |
| 2002/0198831 A1* | 12/2002 | Patricelli et al. | 705/40 |
| 2004/0172312 A1 | 9/2004 | Selwanes et al. | |
| 2005/0086075 A1 | 4/2005 | Kaehler et al. | |
| 2005/0102170 A1 | 5/2005 | Lefever et al. | |
| 2005/0108153 A1 | 5/2005 | Thomas et al. | |
| 2005/0122953 A1 | 6/2005 | Ilic | |
| 2005/0209964 A1 | 9/2005 | Allen et al. | |
| 2007/0005402 A1 | 1/2007 | Kennedy et al. | |
| 2007/0168283 A1 | 7/2007 | Alvarez et al. | |
| 2007/0260969 A1 | 11/2007 | Fetzer | |
| 2007/0265887 A1* | 11/2007 | McLaughlin et al. | 705/4 |
| 2008/0010096 A1 | 1/2008 | Patterson et al. | |
| 2008/0086420 A1 | 4/2008 | Gilder et al. | |
| 2008/0140447 A1 | 6/2008 | Pourfallah et al. | |
| 2008/0281641 A1 | 11/2008 | Pilzer et al. | |
| 2009/0037333 A1 | 2/2009 | Flitcroft et al. | |
| 2009/0138277 A1* | 5/2009 | Warren et al. | 705/2 |
| 2010/0030580 A1 | 2/2010 | Salwan | |
| 2010/0185466 A1 | 7/2010 | Paradis et al. | |
| 2010/0205078 A1 | 8/2010 | Lawrence et al. | |
| 2011/0087598 A1 | 4/2011 | Bozeman | |
| 2011/0178816 A1 | 7/2011 | Lee et al. | |
| 2011/0184857 A1 | 7/2011 | Shakkarwar | |
| 2011/0258004 A1* | 10/2011 | Dean et al. | 705/4 |
| 2012/0022887 A1* | 1/2012 | Chiappe | 705/2 |
| 2012/0215563 A1* | 8/2012 | Lassen et al. | 705/3 |

OTHER PUBLICATIONS

Brousseau, "IBML and the Move Toward Healthcare Electronification", Today, TAWPI, Mar./Apr. 2009, pp. 8-10.

Baker, "Persistence Pays When Posting Payments", Lockbox Payments, Today, TAWPI, Nov./Dec. 2009, pp. 22-23.

Credit Cards, Rising Interchange Fees Have Increased Costs for Merchants, but Options for Reducing Fees Pose Challenges, Highlights of GAO-10-45, Nov. 2009.

Visa's Global Registry of Service Providers—Independent Sales Organizations and Encryption Support Organizations as of Mar. 1, 2012, Visa Inc. 2010, pp. 1-53.

MasterCard Worldwide U.S. and Interregional Interchange Rates, Rates and Criteria Effective as of Oct. 2011, MasterCard 2011, pp. 1-170.

The Payment Card Economics Review, the Industry and Its Legal Challenges, an occasional publication of payingwithplastic.org., vol. 2, pp. 1-224.

Levitin, Priceless? The Social Costs of Credit Card Merchant Restraints, Harvard Journal on Legislation, 2008, vol. 45, pp. 1-58.

The Anatomy of a Transaction, MasterCard Worldwide, AOTE-0707, MasterCard, 2007, pp. 1.

Nacha—The Electronic Payments Association, "A Guide to Understanding EFT Payments Processing", ACH Primer for Healthcare, pp. 1-20, 2011.

* cited by examiner

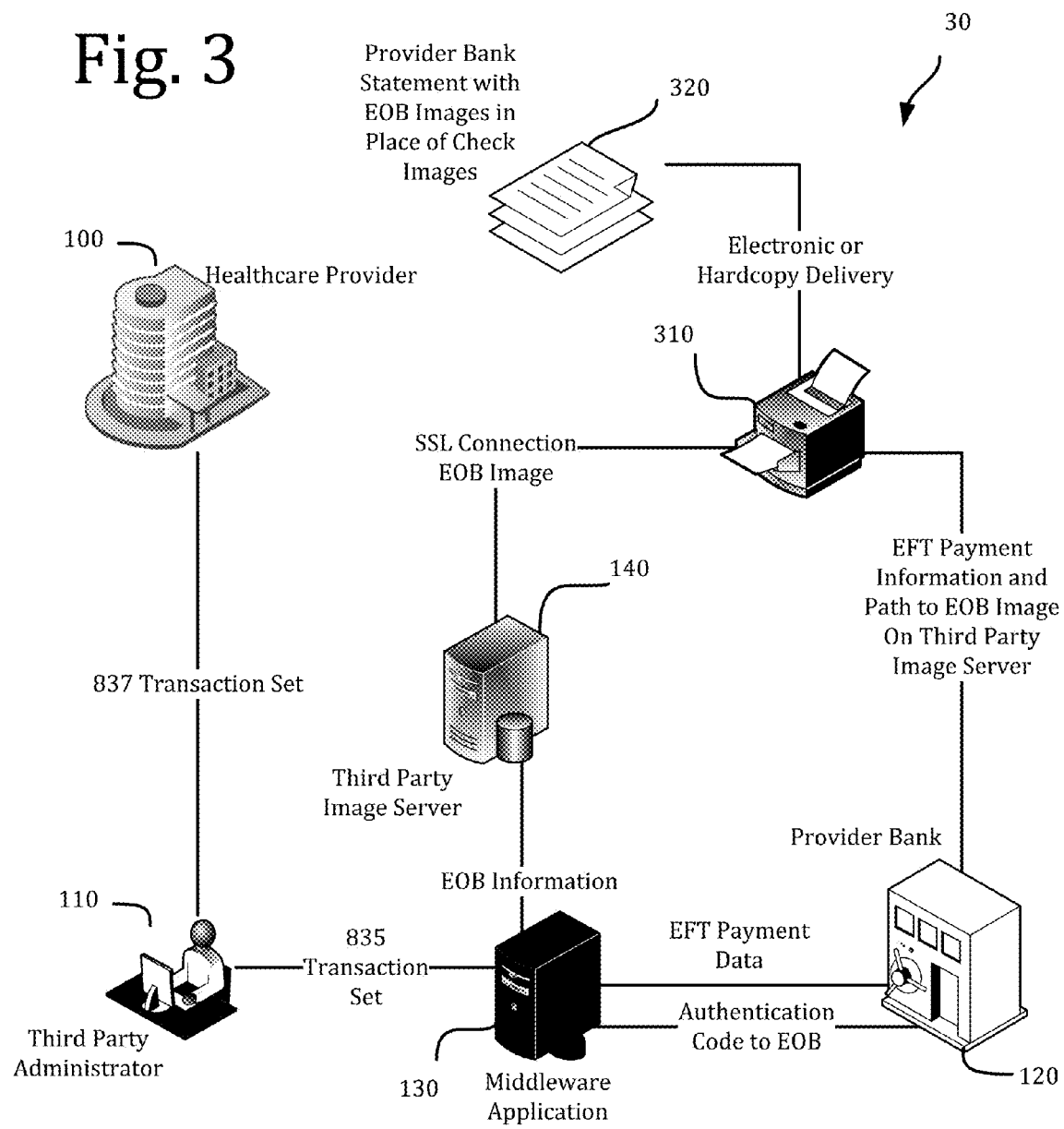

CHECK VIEW SYSTEM WITH EMBEDDED EXPLANATION OF BENEFITS

PRIORITY CLAIM

This application claims priority to U.S. Non-provisional patent application Ser. No. 13/495,492 filed Jun. 13, 2012 entitled "Integrated Payment and Explanation of Benefits Presentation Method for Healthcare Providers" which, in-turn, claims priority to U.S. Provisional Patent Application Ser. No. 61/653,175 filed May 30, 2012 entitled "Integrated Payment and Explanation of Benefits Presentation Method for Healthcare Providers."

BACKGROUND OF THE INVENTION

1. Field of the Invention

This invention relates to electronic payment systems. More specifically, it relates to a method of using check image viewing infrastructure that already exists in bank online portals to display sensitive protected health information such as explanation of benefits to healthcare providers for payment reconciliation.

2. Brief Description of the Related Art

Adjudication, payment and reconciliation of service provider claims against insurance carriers (particularly in the healthcare industry) consumes substantial time and resources. Third party administrators (herein "TPAs"), insurance companies, and large self-funded corporations (herein "Payers") adjudicate claims, compare them to a benefit plan and make the decision to write checks in payment for the claims. Currently, many payers are required to print checks and explanation of benefit (EOB) forms for delivery to the healthcare providers. The EOB lists the amount the healthcare provider billed the Payer's company and the amount the Payer's company paid on the claim. It may also list the contractual discount amount and the patient responsibility. If the claim is denied, the EOB will explain the reason for denial.

In an effort to streamline this process, Applicant developed a process described in U.S. Pat. No. 7,792,686, the specification of which is incorporated herein by reference. The '686 patent discloses a method to deploy a single-load stored value card to pay medical service claims. Since there is a one-to-one relationship between the stored value card and the specific claim, reconciling the payment is made substantially more efficient. However, credit cards (whether stored-value cards, debit cards or the like) incur interchange fees. Thus, a service provider accepting a credit card payment might receive between 95-98% of the authorized payment funds after the transactional costs are deducted.

Electronic fund transfers (EFTs) do not incur the same transactional costs as do payment cards. An EFT is the electronic exchange or transfer of money from one account to another, either within a single financial institution or across multiple institutions, through computer-based systems. However, to set up an EFT the payee (the healthcare provider) would need to make available highly sensitive financial information such as the bank routing number and account number to the hundreds of third party administrators that adjudicate insurance claims.

Another issue with EFT payments is that under new electronic data interchange (EDI) standards, both payment and EOB information may be encoded into the EFT. Based on the Accredited Standards Committee (ASC) X12 format, the 835 transaction set can be used to make a payment and send an EOB. It can send an EOB only from a health-care insurer to a health-care provider, either directly or through a financial institution.

Unless a TPA produces an 835 that healthcare providers will accept, the TPA must still print an EOB, so the provider can reconcile it to their EFT payments. Since EFTs use trace numbers and printed provider EOBs (generally using check numbers marked "void") it creates difficulties for providers to reconcile the EFT deposit to the paper EOB. This in turn can cause an increase in either the number of customer service calls or the provider resubmitting claims. If a TPA is successful in getting half of its healthcare providers to accept 835s this is still a low percentage of EOBs produced for providers. Only the larger healthcare organizations have the ability to accept both an EFT and 835, making them the TPA's largest payees. The means the TPA must still bear the additional expense of producing provider payments the vast majority of the time. Furthermore, receiving banks are hesitant to receive EOB information as it contains protected health information (PHI) which is subject to additional regulations regarding its privacy.

Yet another problem with EFT payments is that the healthcare provider might receive the payment funds from the TPA's EFT authorization, but would need separate logins to hundreds of TPA portals to retrieve EOB information. This would make reconciling nearly unworkable.

Nevertheless, there exists substantial motivation to move to EFT payments. According to the U.S. Healthcare Efficiency Index Fact Sheet, such a move would save $11 billion per year for the healthcare industry. Recent legislation in the United States includes modification of Section 1862(a) of the Social Security Act which mandates the use of EFT for all Medicare reimbursement to healthcare providers by Jan. 1, 2014. Congress has required the EFT and Electronic Remittance Advice (ERA) operating rules must be adopted by Jul. 1, 2012 and implemented no later than Jan. 1, 2014.

What is needed in the art is a method to provide healthcare providers a single login to reconcile both payments and EOBs.

Another need in the art is a method to bifurcate the payment data in an EFT (which banks are accustom to) from the PHI data which has privacy regulations banks find undesirable to accommodate.

Yet another need in the art is to utilize existing infrastructure in a novel way to deliver EOB data securely and linked with payment information for reconciling received funds.

However, in view of the art considered as a whole at the time the present invention was made, it was not obvious to those of ordinary skill in the field of this invention how the shortcomings of the prior art could be overcome.

SUMMARY OF THE INVENTION

The long-standing but heretofore unfulfilled need for secure and efficient EFT adjudicated payments to service providers is now met by a new, useful, and nonobvious invention.

In an embodiment of the invention, a TPA reviews a physician's claim to set a broken arm. The TPA works for a medical insurance company that covers the patient with the broken arm. Although the physician put in a claim for $1,000 the TPA determines that only $600 is covered under the patient's insurance policy. The TPA then authorizes payment of $600 to the physician but also includes an EOB which details the charges were covered and the charges that were denied. It is important for the physician to receive the EOB because it may be used to invoice the patient to cover their financial responsibility (i.e., the remaining $400 of the total $1,000 charge). The physician may submit the claim in an 837 standard format.

The ANSI ASC X12 837 standard can be used to submit healthcare claim billing information, encounter information, or both, from providers of healthcare services to payers, either directly or via intermediary billers and claims clearinghouses (TPAs). It can also be used to transmit healthcare claims and billing payment information between payers with different payment responsibilities where coordination of benefits is required or between payers and regulatory agencies to monitor the rendering, billing, and/or payment of healthcare services within a specific healthcare/insurance industry segment. For purposes of this standard, providers of healthcare products or services may include entities such as physicians, hospitals and other medical facilities or suppliers, dentists, and pharmacies, and entities providing medical information to meet regulatory requirements. The payer refers to a TPA that pays claims or administers the insurance product or benefit or both.

When the 837 submission is adjudicated by the TPA, the TPA returns an EFT under the 835 standard. Banks are well accustomed to handling the payment portion of the 835, but as described above, the 835 specification also encodes the EOB which contains protected health information subject to privacy regulations. Banks would prefer not to have to decode, safeguard and transmit the EOB data if possible. An embodiment of the present invention operates as "middleware" between the sender of the 835 transaction set and the provider's bank. The middleware decodes the EOB from the 835 transaction set and passes the payment information along to the provider's bank but also provides an authentication code to maintain an abstract link between the payment and the EOB data. The authentication code may be as simple as a primary key or may take the form of more advanced and secure methods such as multi-factor authentication, hashes, and other cryptographic key systems. The decoded EOB is stored on a secure third party server such as database. Database server software is readily available under the brands of MICROSOFT SQL SERVER, ORACLE, IBM DB2 and the like.

Virtually all financial institutions offer online banking portals which allow the end-user to view transactions including scanned images of posted paper checks. An important concept in the present invention is that the banks already have the online banking portal infrastructure to view these digital check images. However, with traditional EFT deposits, there is (of course) no digital image of a hardcopy check. The EFT process through an ACH network does not generate paper checks. However, in the instant invention, the provider bank does provide an image with the EFT transaction except the image is that of the EOB text embedded into the image that would normally show a traditional paper check.

To the end user it appears that the EOB image is transmitted from the provider bank. However, in an embodiment of the invention, the provider bank, noting the EFT is an 835 transaction set, assigns the path to the image not to their normal check image URL, but to the third party data store, typically through a secure socket layer (SSL) connection. This is the type of connection used by virtually all online banking portals and end-users note the connection by the use of secure HTTPS prefix as opposed to the unsecured HTTP before the full URL path. In an alternate embodiment of the invention, a plurality of authorization levels may be provided wherein the EFT payment transaction is at a first authorization level and the EOB image access is at a second authorization level. This would permit healthcare providers to granularly determine which types of information are viewable to different user groups (e.g., financial, PHI or both).

In another embodiment of the invention, the image generated by the EOB data extracted from the 835 transaction set is reproduced on the bank statement sent to the healthcare provider. The bank statement may be paper based or digital. A digital version may be further encrypted with a HIPAA-compliant password so that the EOB data has an additional layer of protection.

In an embodiment of the invention, the payment image file generated upon the extraction of the EOB information from the EFT transaction set and the payment image file may be saved to a file store for later retrieval (i.e., cached). Alternatively, the payment image file may be generated on demand when a URL request is received for the image. The cached image embodiment may be more responsive and incur less latency but the "on-demand" real-time generation of the image may have additional security advantages.

BRIEF DESCRIPTION OF THE DRAWINGS

For a fuller understanding of the invention, reference should be made to the following detailed description, taken in connection with the accompanying drawings, in which:

FIG. 3 is a diagrammatic view of an embodiment of the invention showing an exemplary workflow of information processing utilizing monthly statements to present EOB and payment information together.

DETAILED DESCRIPTION OF THE PREFERRED EMBODIMENT

Figure 1:
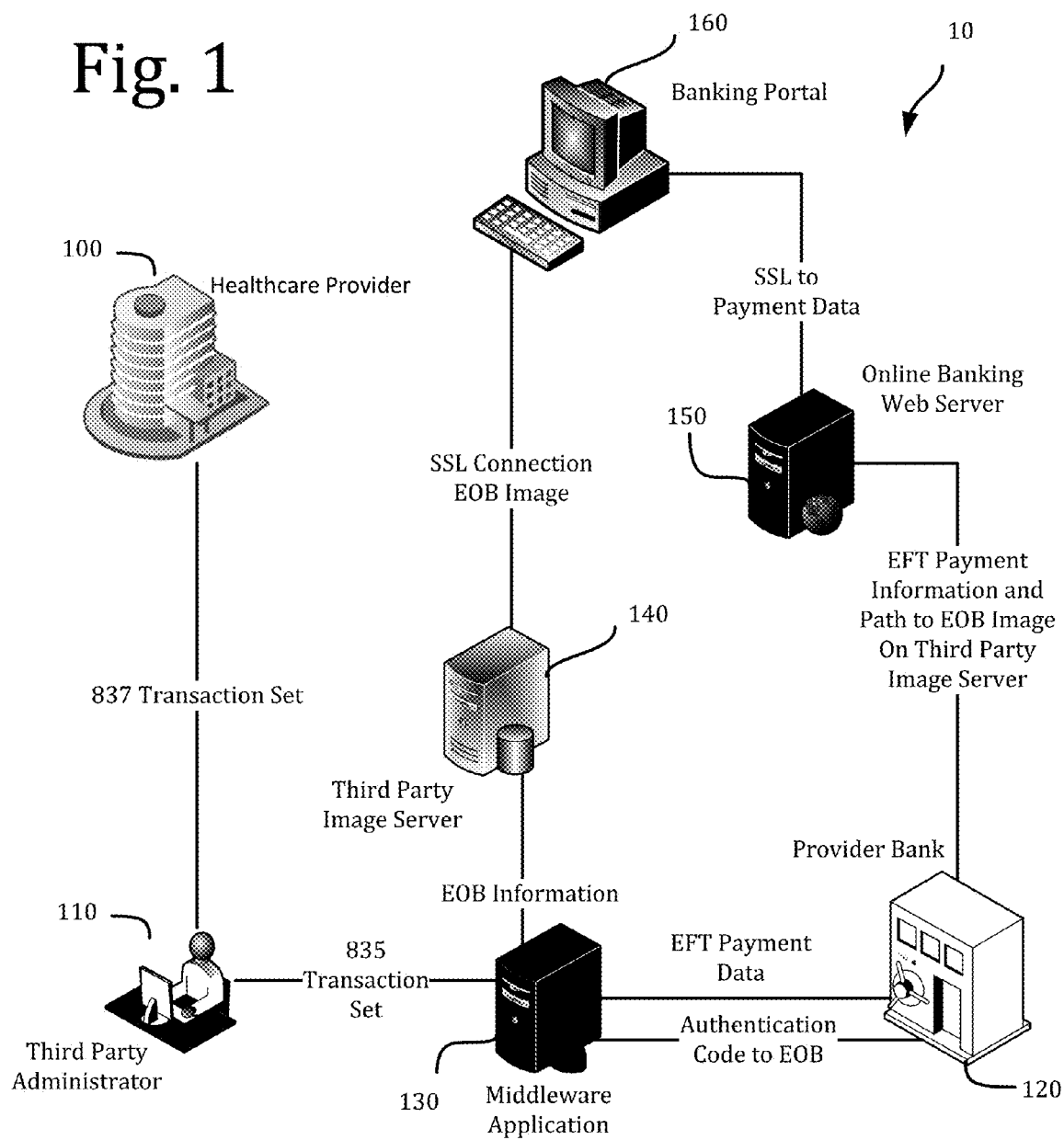
FIG. 1 is a diagrammatic view of an embodiment of the invention showing an exemplary workflow of information processing for presenting EOB data through an online banking portal.

The novel method is denoted as a whole in FIG. 1 by the reference numeral 10. Healthcare provider 100 treats a patient and sends an 837 transaction set to third party administrator (TPA) 110. TPA 110 adjudicates the claim and returns an 835 transaction set to provider bank 120. However, provider bank 120 has middleware application 130 intercept the 835 transaction set which decodes the EOB information and passes on the EFT payment data and an authentication code that links the payment to the EOB which has already been extracted. The EOB information is passed to a third party image server 140 which renders the EOB text into an image formatted to the dimensions of a check image presented through virtually all online banking portals. Online banking web server 150 accesses the EFT payment information from provider bank 120 and presents the EFT information at banking portal 160 via an SSL connection. However, online banking web server 150 also has path information to the EOB image on third party image server 140. A separate SSL connection is made from the banking portal 160 to the EOB image residing the third party image server 150.

It should be noted that in an alternative embodiment of the invention provider bank 120 may alternatively choose to decode the EOB from the 835 transaction set and present the rendered image of the EOB from their own web server 150 or related network. It is not necessary that a third party image server 140 be deployed if provider bank 120 chooses to accept and maintain PHI data. The rendering the EOB image may use any one of a number of bitmapped formats including but not limited to, JPG, GIF, TIF, PCX, BMP, and PNG. The EOB image may also be rendered in formats capable of maintaining vector paths and/or fonts such as ADOBE portable document format (otherwise known as PDF files). Finally, the limitation of EOB image should not be necessarily construed to graphic formats. The EOB image could comprise an array of plain, rich, or HTML text arranged to fit into the placeholder normally reserved for viewing a posted hardcopy check that has been digitized.

Online banking web server 150 may be any HTML compliant server such as those commercially available including, but not limited to, IBM WEBSPHERE, MICROSOFT INTERNET INFORMATION SERVER, and APACHE. The authentication code that links the EOB and payment is used as a layer of abstraction between the third party image server 140 EOB record and the EFT payment record presented by online banking web server 150. A simple primary key linking table would serve to link the two records together but may not necessarily be secure, particularly if the primary key was an incrementally generated simple integer. Various forms of authentication including unique GUID keys, multi-factor authentication and the like may be used to securely link the EOB and the payment data between disparate network connections.

An anticipated deployment of the current technology would include offering a provider bank to healthcare providers for accepting incoming 835 transaction sets from TPAs 110. Provider bank 120 may be different from an operating bank used by healthcare provider 100 for paying vendors, performing payroll and the like. Alternatively, it may be a separate, special account within the same financial institution they already use. To accept EFT payments over an ACH network provider bank 120 would share the routing and account number for healthcare provider with hundreds of TPAs 110 for making 835 transaction set credits. Provider bank 120 would have a substantial competitive advantage over other banks used by healthcare providers that do not have the capability of displaying EOB images in association with EFT payments. Once provider bank 120 integrates the EOB imaging into their banking portal 160, little else need be done.

Another advantage of the present system is that obtaining electronic access to EOB information by healthcare provider 100 occurs through single banking portal 160 with a single login. Healthcare provider 100 does not want to use proprietary online EOB portals from potentially hundreds of TPAs 110 that adjudicate claims for various insurance carriers.

Yet another advantage of the present invention is that the EOB and payment information is tied together using the infrastructure that already exists for banking portals 160. By imaging the EOB string data into an image format compatible with a secure HTML page, provider bank 120 incurs nominal costs for implementing the system, TPA 110 enjoys a reduced number of customer service calls and healthcare provider 100 enjoys faster, easier and more intuitive administration of claims and payments.

Figure 2:
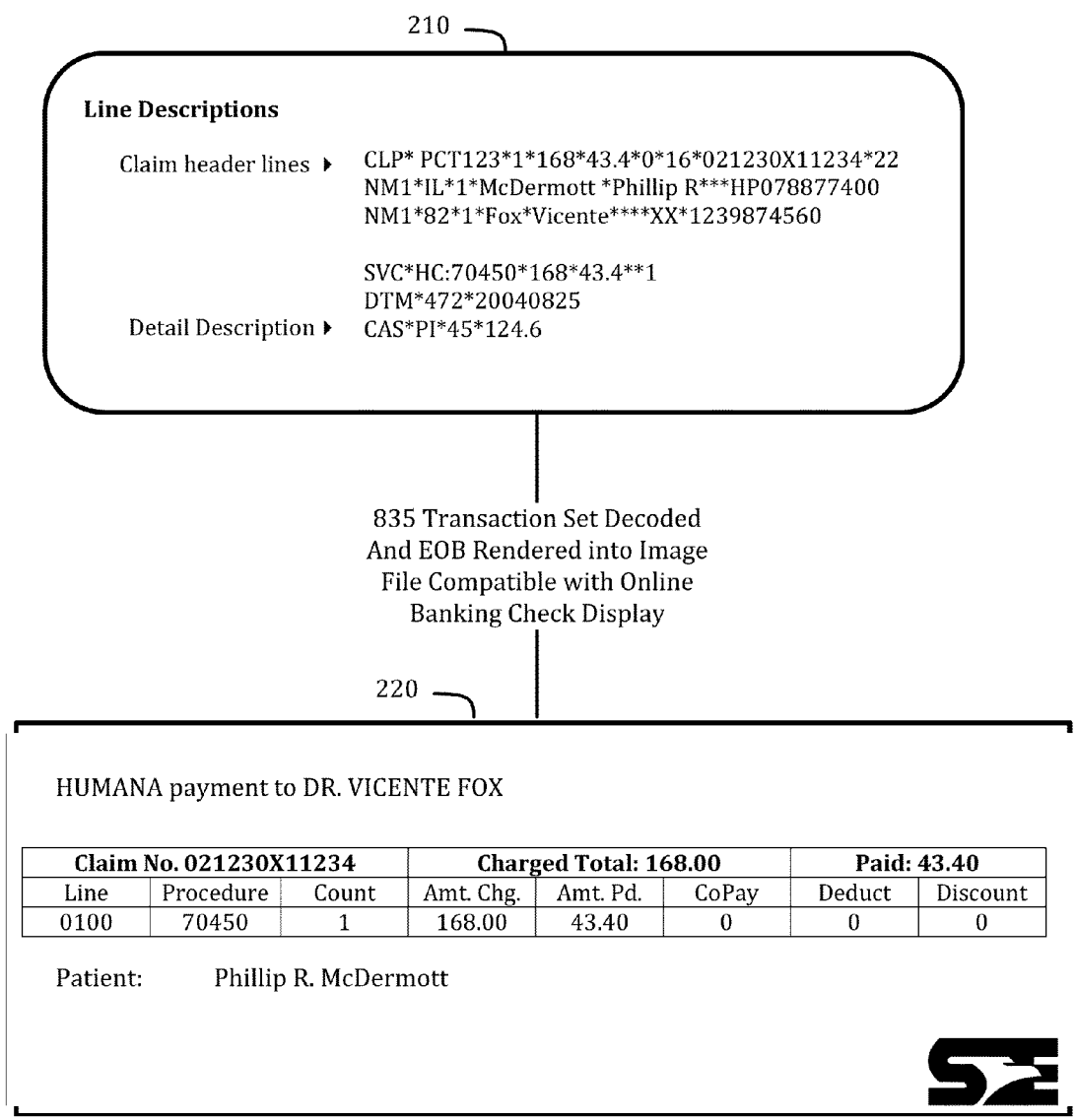
FIG. 2 is a conceptual view of a transaction set decoded and imaged into a check-dimensioned format.

FIG. 2 shows a transaction set 210 containing EOB and payment data together. The transaction set is then decoded and EOB image 220 is generated and viewable through banking portal 160 so that healthcare provider 100 can reconcile claims with payments and potentially invoice patients for amounts not covered by their insurance carrier as determined by TPA 110.

FIG. 3 shows an alternative embodiment of the invention wherein paper or electronic statements 320 have EOB image data imprinted 310 onto them. This permits healthcare provider 100 to easily reconcile claims versus payments on a periodic basis (usually monthly).

Glossary of Terminology

ACH Network: is an electronic network for financial transactions. The acronym ACH stands for automated clearing house. ACH processes large volumes of credit and debit transactions in batches. Rules governing ACH network operations are established by NACHA and the Federal Reserve.

ACH Operator: is an entity that acts as a central facility for the clearing, delivery and settlement of electronic money transfers through an ACH network or among participating depository financial institutions.

Authentication Code: is a secure code that links the EOB with the payment information across disparate computers and/or networks. For example, requiring the provider bank to supply a copy of an authentication code transmitted to the canonical or trusted point of contact for that identity before the EOB payment image file is transmitted to the designated endpoint.

Authorization: is permission obtained by the Originator from a Receiver to initiate entries through the ACH Network to the Receiver's account.

Computer display device: is a computer screen capable of displaying images and text. The computer display device may be a desktop display, laptop display, tablet display or portable device such as a smart phone.

Electronic Data Interchange (EDI): is the exchange of computer-processable data in a standardized format between two enterprises.

EDI 835: is a specification for the EDI Healthcare Claim Payment/Advice Transaction Set which can be used to make a payment, send an Explanation of Benefits (EOB), send an Explanation of Payments (EOP) remittance advice, or make a payment and send an EOP remittance advice only from a health insurer to a healthcare provider either directly or via a financial institution.

Electronic Funds Transfer (EFT): is the electronic debit or credit of money from one account to another, either within a single financial institution or across multiple institutions, through computer-based systems.

Health Insurance Portability and Accountability Act of 1996 (HIPPA, Title II): known as the Administrative Simplification (AS) provisions, requires the establishment of national standards for electronic healthcare transactions and national identifiers for providers, health insurance plans, and employers.

NACHA (association): is a non-profit association and private sector rulemaking body that supports the ACH Network integrity by managing its development, administration and governance. NACHA develops and enforces the NACHA Operating Rules.

NACHA (operating rules): are the body of work defining the requirements for all EFT transactions processed through the ACH Network. Financial Institutions, Originators, ACH Operators, and Third-Party Vendors using the ACH Network agree to be bound to the Rules.

Participating Depository Financial Institution: is a financial institution that is authorized by applicable legal requirements to accept deposits, has been assigned a routing number by Accuity, and has agreed to be bound to the NACHA Operating Rules.

Payment image file: is an image file capable of being viewed by a computer display device. The image file may be bitmapped such as a PCX, TIF, GIF, JPG or PNG format. It may also contain vector or font data that is non-bitmapped which is supported by formats such as encapsulated postscript, PDF (portable document format by ADOBE) or the like.

Provider Bank: is the financial institution that receives payment for services rendered by the service provider (e.g., a physicians group, automobile repair facility or the like).

Routing/Transit Number: is a nine digit bank code, used in the United States, which appears on the bottom of negotiable instruments such as checks identifying the Financial Institution on which it was drawn.

Third-Party Image Server: is a computer software server, generally coupled to a local and/or wide area network that receives, stores and transmits image files to authorized and authenticated computers and/or users. The server may be a single computer, a virtualized machine or multiple machines networked together such as a database server and file server operating together to store and fetch files responsive to T-SQL queries.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A method for facilitating the delivery of electronic funds and displaying an explanation of benefits to a service provider comprising the steps of:
   receiving, by a provider bank application computer between the sender and the provider's bank, an adjudicated claim from a third party administrator containing both payment information and an explanation of benefits (EOB) encoded into an electronic funds transfer (EFT);
   decoding, by the application, the received EFT into the payment information and a separate EOB;
   generating, by the application, an authentication code that links the payment information and the EOB;
   sending, by the application, the payment information and the authentication code to a provider bank where it is stored on a bank data store;
   sending, by the application, the explanation of benefits and authentication code to a third-party processor where it is stored on an EOB data store;
   generating, by a third-party processor, an EOB image file from the EOB, the EOB image file embeddable within an online check viewing application administered by the provider bank;
   embedding, by the third-party processor, the EOB image file within a preexisting provider bank interface used for displaying scanned, digital images of posted paper checks such that the EOB image file is not directly provided by the bank;
   responsive to an inquiry by the service provider through the online check viewing application for the payment information for the adjudicated claim, retrieving the payment information from the bank data store and the explanation of benefits from the EOB data store; and
   displaying, on a portal computer, the embedded EOB image file with the linked payment information based on the authentication code.

2. The method of claim 1 wherein the specification for the EFT is electronic data interchange (EDI) 835.

3. The method of claim 1 wherein EOB image file is transmitted via a secure socket layer (SSL) connection with the EOB data store.

4. The method of claim 1 wherein the EOB image file is generated upon receipt of the explanation of benefits by the third party processor, and the EOB image file is cached for later retrieval.

5. A system for facilitating the delivery of electronic funds and displaying an explanation of benefits to a service provider, the system comprising at:
   a provider bank application computer, between the sender and the provider's bank, configured to receive an adjudicated claim from a third party administrator containing both payment information and an explanation of benefits (EOB) encoded into an electronic funds transfer (EFT);
   the application computer further configured to decode the received EFT into the payment information and a separate EOB;
   the application computer further configured to generate an authentication code that links the payment information and the EOB;
   the application computer further configured to send the payment information and the authentication code to a provider bank where it is stored on a bank data store;
   the application computer further configured to send the explanation of benefits and authentication code to a third-party processor where it is stored on an EOB data store;
   a third-party processor, separate from the provider bank, configured to generate an EOB image file from the EOB, the EOB image file being embeddable with an online check viewing application administered by the provider bank;
   the third-party processor further configured to embed the EOB image file within a preexisting provider bank interface used for displaying posted paper checks such that the EOB image file is not directly provided by the bank;
   a portal computer configured to, responsive to an inquiry by the service provider through the online check viewing application for the payment information for the adjudicated claim, retrieve the payment information from the bank data store and the explanation of benefits from the EOB data store; and
   the portal computer further configured to display the embedded EOB image file with the linked payment information based on the authentication code.

6. The system of claim 5 wherein the specification for the EFT is electronic data interchange (EDI) 835.

7. The system of claim 5 wherein EOB image file is transmitted via a secure socket layer (SSL) connection with the EOB data store.

8. The system of claim 5 wherein the EOB image file is generated upon receipt of the explanation of benefits by the third party processor, and the EOB image file is cached for later retrieval.

9. A system for facilitating the delivery of electronic funds and displaying an explanation of benefits to a service provider, the system comprising at:
   a provider bank application computer, between the sender and the provider's bank, configured to receive an adjudicated claim from a third party administrator containing both payment information and an explanation of benefits (EOB) encoded into an electronic funds transfer (EFT);
   the application computer further configured to decode the received EFT into the payment information and a separate EOB;
   the application computer further configured to generate an authentication code that links the payment information and the EOB;
   the application computer further configured to send the payment information and the authentication code to a provider bank where it is stored on a bank data store;
   the application computer further configured to send the explanation of benefits and authentication code to a third-party processor where it is stored on an EOB data store;
   a third-party processor, separate from the provider bank, configured to generate an EOB text file from the EOB, the EOB text file being embeddable with an online check viewing application administered by the provider bank;

the third-party processor further configured to embed the EOB text file within a preexisting provider bank interface used for displaying posted paper checks such that the EOB text file is not directly provided by the bank;

a portal computer configured to, responsive to an inquiry by the service provider through the online check viewing application for the payment information for the adjudicated claim, retrieve the payment information from the bank data store and the explanation of benefits from the EOB data store; and the portal further configured to display the embedded EOB text file with the linked payment information based on the authentication code.

10. The system of claim 9 wherein the specification for the EFT is electronic data interchange (EDI) 835.

11. The system of claim 9 wherein EOB image file is transmitted via a secure socket layer (SSL) connection with the EOB data store.

12. The system of claim 9 wherein the EOB image file data is generated upon receipt of the explanation of benefits by the third party processor, and the EOB image file is cached for later retrieval.

\* \* \* \* \*